3,275,491
LAMINATING WITH WET ADHESIVE WEBS
Donald Verne Redfern, Seattle, Wash., assignor to Weyerhaeuser Company, Tacoma, Wash., a corporation of Washington
No Drawing. Continuation of application Ser. No. 37,513, June 20, 1960. This application Jan. 8, 1965, Ser. No. 424,213
7 Claims. (Cl. 156—313)

This is a continuation of application Serial No. 37,513 filed June 20, 1960, now abandoned. This invention concerns a process of laying up materials from whole wood or from reconstituted wood-like boards and forming bonded laminates therefrom in a continuous process. The process is generally applicable to board and veneer laminating, and is particularly useful in making plywood.

Laminating, particularly the manufacture of plywood, is generally carried out by first applying a wet adhesive to one of the surfaces to be bonded, next placing another element having a surface to be bonded thereto in contact with the adhesive and finally applying sufficient pressure to insure uniform contact while forming the adhesive bond.

In production laminating work the adhesive is spread on one bonding surface by an adhesive coated roll. While in some instances one coated roll is used, in others, notably in plywood manufacture, a pair of adhesive coated rolls are used. When two rolls are used they are normally arranged so that both surfaces of an intermediate core are simultaneously coated with adhesive. Roll application of wet adhesive to a wood surface is not entirely satisfactory.

Application of a wet adhesive to only one of the surfaces to be bonded is frequently disadvantageous. If the surface is highly absorptive, the adhesive may soak in sufficiently to result in a starved bond. Such bonds are weak. An extra heavy coat of adhesive will compensate to some extent for such absorption, but this is costly and difficult to achieve during the high speed production of laminated boards.

Better bonds can generally be achieved if both of the opposing surfaces to be joined can each be coated with adhesive. While this can be done in small bonding operations, as when the adhesive is applied with a brush, it is difficult to accomplish when manufacturing plywood or performing other high speed laminating operations using roll coating. In this new process the benefits equivalent to applying the adhesive to both of a pair of opposing surfaces is obtained.

Wood veneers are characterized by absorptive springwood areas, less absorptive summer-wood areas and moisture repellant pitchy areas. In addition rotary cut veneers are often pitted, humped, and cracked on the surface. They also may vary sufficiently in thickness to exert varying resistance to the adhesive coating rolls.

The amount or spread of adhesive transferred to the wood from the roll varies with the pressure exerted by the roll against the wood. It varies with regard to variations of wood thickness and/or roll spacing and it also varies with the comparative roughness of the wood surface. High roll pressure or very smooth wood surfaces will result in minimum and sometimes insufficient adhesive application while low roll pressure or a rough surface will result in a maximum and often uneconomical adhesive application.

These defects all result in highly variable spreads and frequently in unsatisfactory adhesive bonds. It is not unusual to have the spread vary on Douglas fir core material as much as 5 to 10% on either side of a desired spread value. When the spread is too low, the bond is endangered by dryout, and when the spread is too high, it is wasteful of adhesive.

This new process results in an exceptionally uniform adhesive film between the bonding surfaces. The amount of adhesive spread is not affected by the relative roughness or smoothness of the surfaces or roll pressure variations. In this process the spread normally varies less than 1% on either side of the desired value.

The present invention is particularly adaptable to the automatic or continuous production of plywood, an advantage long sought by the industry.

In its broadest aspect the wet adhesive material is first applied to an absorptive web by roll coating, dipping, or spraying. A preferred web is absorptive paper to which the adhesive is applied by simultaneously roll coating both sides. The wetted web is then placed between the surfaces to be bonded without permitting the adhesive to dry out or to lose substantial quantities of its solvent. The bond is perfected by application of pressure and heat as required by the specific adhesive.

More in detail, a paper web is first impregnated with an aqueous solution of an alkaline phenol-formaldehyde adhesive composition.

The adhesive composition comprises an alkaline phenol-formaldeyde resin having a mole ratio of from 1.5 to 3 moles of formaldehyde per mole of phenol.

The adhesive composition is next applied to the paper web at a rate to provide at least about 3 pounds of resin solids per 1,000 square feet of paper web.

Without losing any substantial amount of moisture, the resin bearing web is then placed between the laminae which are to be bonded together. Heat and pressure are then simultaneously applied to the laminae, as in conventional methods of making plywood, until the bond is cured sufficiently to allow removal of the pressure.

The exact amount of heat, and time of pressure application will vary somewhat according to the requirements of the particular adhesive composition employed. Typical conditions, when making $13/16''$ five-ply plywood, will be to maintain the press platens at 285° F. and to maintain a panel pressure of 185 pounds per square inch for 7½ to 9 minutes.

The physical characteristics of the dry web material are important. It is preferable that the web be capable of absorbing the wet adhesive composition and becoming uniformly impregnated with adhesive from surface to surface. Such impregnation, in the case of webs of low absorption, may take place during pressing; thus, when the resin is first brought to the web, there may only be surface application of the adhesive. A preferred web material is paper of the type generally known as "tissue" or "toweling" or "napkin" stock. The paper may contain wet strengthening resins which are desirable as they insure that the paper when wet is sufficiently strong to be manipulated and laid upon the surfaces to be bonded without tearing. However, the amount thereof should be such as not to materially reduce the absorption properties of the paper.

Other characteristics of the dry web are important. Its thickness and fiber content should be such as to afford maximum adhesive holding capacity consonant with thorough absorption and uniform distribution of the adhesive throughout the web at least upon completion of curing. A web which is too thick or of low absorption and which contains too much fiber may absorb only some of the adhesive, with most of the adhesive concentrated near the paper surface. When pressing takes place, unless the resin flows throughout and impregnates the web, the bond will be weak and delamination may take place along the center of the web between its surfaces. A paper web which is too thin frequently will not have enough strength to be manipulated into position on the wood when wetted with adhesive materials.

This process of making laminated materials uses an alkaline condensation product made by reacting an aldehyde with a phenol in the presence of an alkaline catalyst.

Resinous adhesives for conventional plywood manufacture are necessarily mixed with dry, flour-like materials such as ground nut shells, tree bark, or waste agricultural residues from furfuraldehyde manufacture. These materials aid in retaining uniform adhesive distribution in the glue line by resisting adhesive penetration into the wood. The thixotropic viscosity characteristics which these materials impart to the resins also aid in spreading and minimizing dryout of the adhesive film.

While such additives can be present in the resins without detrimental effect when they are applied to the web carrier, their use is not essential. The paper carrier serves in a sense as a substitute for such additives and thereby insures a highly uniform resin distribution over the wood surface. The resin is thus prevented from unevenly penetrating the wood to the detriment of the final bond as is the case on occasion with non-uniform spreads. When pressure and heat are applied to such uniform spread of resin, the wet adhesive readily flows from, as well as throughout, the web in an amount requisite to provide a firm bond.

A further and basic advantage is achieved by using a wet web carrier in contrast to a dry adhesive carrying web. The modern phenolic resins developed for plywood bonding are relatively fast curing as long as they are retained in an aqueous system. Once the aqueous phase has been unbalanced by excessive loss of water or other solvent from the adhesive the resins may lose their capacity to flow and bond properly. By special techniques such as reducing the ratio of formaldehyde to phenol, resins can be formulated which will retain their flowability when dry, and such resins can be used to provide a dry adhesive web. However, such dry adhesive webs are slow curing in comparison to a wet adhesive web used in this invention.

To insure the rapid curing characteristic of the wet adhesive web the phenolic resin employed should have a molar ratio of formaldehyde to phenol of between about 1.5 and about 3.0.

The following examples describe phenolic resins which are useful for bonding veneer according to this invention:

*Example I*

A water soluble, alkaline, phenol-formaldehyde resin was prepared in a resin kettle equipped with cooling, heating, and stirring facilities. The following materials were placed in the kettle in the amounts shown:

| Material: | Parts by weight |
|---|---|
| Phenol (90% strength) | 27.98 |
| Water | 5.83 |
| Formaldehyde (37% uninhibited) | 48.88 |
| Sodium hydroxide solution (50% strength) | 5.77 |

The above were agitated continuously and heated to 90° C. in 60 minutes. The temperature was held at 90° C. until a sample showed a viscosity of 65 centistokes when measured at 25° C. Cooling was then commenced to reduce the temperature to 80° C., and the viscosity allowed to increase to 627 centistokes. Upon reaching 627 centistokes, there was added:

Sodium hydroxide solution (50% strength) _____ 7.69

This immediately reduced the viscosity, however, heating at 80° C. was continued until the viscosity reached 550 centistokes. There was then added:

Water _____ 3.85

The resin was then completed by cooling to 20° C. The finished resin had the following constants:

Molar ratio of formaldehyde to phenol _____ 2.25 to 1
Percent resin solids _____ 43
Viscosity @ 25° C. _____centistokes__ 627
Specific gravity 25°/25° C. _____ 1.197

*Example II*

A second phenolic resin was prepared by reacting the following in a resin kettle:

| Material: | Parts by weight |
|---|---|
| Phenol (100% strength) | 26.63 |
| Formaldehyde (37% uninhibited) | 47.00 |
| Sodium hydroxide solution (50% strength) | 1.87 |

The above were agitated continuously and heated to 60° C. in 45 minutes where the temperature was maintained for 30 minutes. The temperature was then raised to 90° C., and maintained until a viscosity of 93 centistokes was obtained on a sample cooled to 25° C. The temperature was then reduced to 80° C. and maintained until the viscosity reached 588 centistokes. The following were then added:

Sodium hydroxide solution (50% strength) _____ 8.41
Water _____ 10.96

These additions reduced the viscosity to about 182 centistokes. The temperature was maintained at 80° C. until a viscosity of 250 centistokes was achieved, whereupon the temperature was reduced to and held at 75° C. When the viscosity reached 330 centistokes there was added:

Sodium hydroxide solution (50% strength) _____ 5.13

The resin was then partially dehydrated by removing water under reduced pressure. A total of 7.94 parts water were removed. The resin was then cooled to below 25° C.

The finished resin had the following constants:

Molar ratio of formaldehyde to phenol _____ 2.04 to 1
Percent resin solids _____ 49.4
Viscosity @ 25° C. _____centistokes__ 500
Specific gravity 25°/25° C. _____ 1.232

*Example III*

A phenolic resin was prepared by reacting the following in a resin kettle:

| Material: | |
|---|---|
| Phenol (90% strength) | 38.79 |
| Formaldehyde (46.5% strength) | 44.42 |
| Methyl cellulose (4000 cps.-technical grade) | 0.18 |
| Water | 12.37 |
| Sodium hydroxide solution (50% strength) | 3.14 |

The above materials were heated, with continuous agitation, to 85° C. in 100 minutes. The temperature was maintained at 85° C. until the viscosity reached 200 centistokes as measured at 25° C. The temperature was then reduced to 80° C. and there maintained until the viscosity reached 884 centistokes. There was then added:

Sodium hydroxide solution (50% strength) _____ 1.10

The pressure was then reduced over the resin and 1.5 parts of water removed by dehydration. The resin was completed by cooling to about 20° C.

The resin had the following constants:

Molar ratio of formaldehyde to phenol _____ 1.85
Percent solids _____ 50.3
Viscosity @ 25° C. _____centistokes__ 1180
Specific gravity @ 25°/25° C. _____ 1.177

In each of the above examples the viscosity measurements were made by the Gardner-Holdt bubble system, which is well known in the resin making art. The viscosity values were determined by adjusting a resin sample (either the final resin or an intermediate sample) to 25° C. before measurement.

The above examples are representative of various alkaline phenol-formaldehyde resins which are useful for bonding plywood in accordance with this process. Other alkaline phenolic resins having somewhat different properties, but having formaldehyde to phenol molar ratios between about 1.5 to 1 and about 3 to 1 are the equivalent of those described.

The resins of Examples I, II, and III can be used without modification to make plywood by this new process. The resins are coated directly onto the paper web, the wet web is immediately placed between the veneers to be united, and the veneers are then pressed and heated.

While the resins described can be used directly as the adhesive composition it is preferred to improve the performance by appropriate additives.

The following examples are directed to the preparation of improved adhesive compositions based upon the resins of Examples I, II, and III:

*Example IV*

The resin was first placed in a mixing vessel and the additives shown below were dissolved therein at room temperature.

Material:                                   Parts by weight
    Resin according to Example II _____ 100
    Sodium hydroxide solution (50% strength) __ 5
    Sodium carbonate _____ 2

*Example V*

Material:
    Resin according to Example II _____ 100
    Sodium hydroxide solution (50% strength) __ 5
    Sodium carbonate _____ 2
    Resorcinol _____ 2
    Paraformaldehyde _____ 2

*Example VI*

Material:
    Resin according to Example II _____ 100
    Sodium hydroxide solution (50% strength) __ 5
    Sodium chromate _____ 1

*Example VII*

Material:
    Resin according to Example I _____ 100
    Sodium hydroxide solution (50% strength) ___ 5
    Sodium chromate _____ 0.5

*Example VIII*

Material:
    Resin according to Example III _____ 100
    Sodium hydroxide solution (50% strength) __ 5
    Sodium carbonate _____ 0.5

*Example IX*

Material:
    Resin according to Example I _____ 100
    Sodium hydroxide solution (50% strength) __ 5
    Sodium carbonate _____ 1

*Example X*

Material:
    Resin according to Example III _____ 100
    Sodium hydroxide solution (50% strength) __ 5
    Sodium chromate _____ 0.5

The adhesive composition may contain dry fillers in addition to chemical additives. The following adhesive compositions, based on the resins of Examples I, II and III, illustrate the use of such dry filler materials. The resins, filler, chemicals and water were mixed until uniform and lump free:

*Example XI*

Water at 20° C. _____ 195
Dry, finely ground agricultural residue from furfuraldehyde manufacture _____ 100
    Mix 1 minute.
Sodium hydroxide solution (50% strength) _____ 50
    Mix 15 minutes.
Sodium carbonate _____ 20
    Mix 5 minutes.
Resin of Example I _____ 560
    Mix 5 minutes.
Water @ 20° C. _____ 50
    Mix 5 minutes.

*Example XII*

Water @ 20° C. _____ 202.5
Finely ground walnut shell flour _____ 115
    Mix 1 minute.
Sodium hydroxide (flake form—100% strength) _ 22.5
    Mix 15 minutes.
Sodium carbonate _____ 15
    Mix 5 minutes.
Resin of Example I _____ 550
    Mix 5 minutes.

*Example XIII*

Material:                                   Parts by weight
    Sodium hydroxide solution (50% strength) __ 560
    Water @ 185° F. _____ 1200
        Mix 1 minute.
    Ground Douglas fir bark _____ 200
        Mix 2 minutes.
    Sodium carbonate _____ 200
        Heat to 190°–200° F. and hold for 20 minutes, then cool to 140° F. and add
    Diesel oil _____ 24
    Resin of Example III _____ 2500
        Mix 5 minutes while cooling to 80° F.

The adhesive composition shown in Example XII was applied to a paper web according to this invention. The wet web was immediately placed between Douglas fir veneers, and the veneers were then subjected to heat and pressure after the elapse of various assembly times.

Test pieces, 1" x 3", were prepared from the resulting plywood and the test pieces were subjected to alternate boiling in water and drying in accordance with the Commercial Standards for exterior plywood, CS45–55, par. 5.3.2. The wet test pieces were then shear tested and the breaking strength and percent wood failure noted. The following Table A shows the detailed test results:

TABLE A

| Panel Construction and Pressing Conditions | Spread in Pounds of Resin Solids/ 1,000 sq. ft. of Paper | Assembly Time, Minutes | Test Results | |
|---|---|---|---|---|
| | | | Breaking Strength, p.s.i. | Wood Failure, Percent |
| 3-ply, ⅜" thick panels, pressed 3 min. at 185 p.s.i. at a temperature of 300° F. | 7.2 | 3 | 181 | 98 |
| | | 3 | 84 | 98 |
| | | 12 | 107 | 99 |
| | | 12 | 167 | 97 |
| | | 20 | 164 | 97 |
| 5-ply, 1³⁄₁₆" thick panels, pressed 7 min. at 185 p.s.i. at a temperature of 300° F. | 7.8 | 3 | 97 | 85 |
| | | 12 | 97 | 90 |
| | | 12 | 92 | 92 |
| | | 20 | 121 | 91 |
| | | 20 | 84 | 97 |

The adhesive compositions of Examples I through XI and Example XIII were also used to make plywood according to the invention, but a semi-automatic lay up system was employed.

The bottom veneers were arranged to move in sequence on a horizontally disposed travelling chain. A first paper web was coated on both faces with the adhesive composition by passing the paper continuously between two coating rolls and was then deposited on the moving veneers in a continuous web. The speed of the web and the veneers was synchronized so a smooth web layer was achieved. A second veneer was positioned on top of the adhesive bearing web with its grain disposed at an angle to the bottom veneer. A second adhesive coated web was synchronously deposited on the second veneer forming a plywood sub-assembly. A third veneer was then placed on the second web with its grain parallel to the first veneer. This formed a 3-ply assembly ready for pressing.

The web spanning the space between the sequentially moving veneers was parted by a moving high velocity air blast prior to stacking some of the assemblies for pressing. The web of other assemblies was parted by a circular saw prior to stacking.

The assemblies were hot pressed to cure the adhesive composition and form the completed plywood panels.

The finished panels were tested for bond strength and percent wood failure in a manner analagous to that described for Example XII above. The results achieved were equal to or superior to plywood made by the conventional method.

If desired, two or more sub-assemblies can be stacked to produce a plywood panel of any thickness or number of plies. The last veneer placed on the stack will form the face, thus completing the panel. When stacking sub-assemblies, it is of course necessary to insure that the grain of each successive veneer is angularly disposed to the grain of the adjacent veneer.

The invention is claimed as follows:

1. The process of laminating comprising
   uniformly applying an aqueous, alkaline, phenol-formaldehyde resinous adhesive composition on both surfaces of an absorbent paper web
   said adhesive composition being applied as a liquid including resin solids having a formaldehyde to phenol molar ratio between about 1.5 to 1 and 3 to 1
   said adhesive composition being applied to said web at the rate of at least about 3 pounds of resin solids per 1,000 square feet of paper web;
   immediately without substantial reduction of moisture from said liquid adhesive composition interposing said resin bearing paper web between the opposed surfaces of two laminae to be joined, and
   thereafter subjecting said laminae and said interposed web to heat and pressure to consolidate and bond the same.

2. The process of claim 1 wherein
   one of said laminae including at least two individual pieces of material which are held in an abutting side-by-side relationship by said web.

3. The process of laminating comprising
   uniformly impregnating an aqueous, alkaline, phenol-formaldehyde resinous adhesive composition into the surfaces of an absorbent paper web
   said adhesive composition including resin solids having a formaldehyde to phenol molar ratio between 1.5 to 1 and 3 to 1
   said adhesive composition being applied to said web at the rate of at least about 3 pounds of resin solids per 1,000 square feet of paper web;
   immediately without substantial reduction of moisture from said adhesive composition interposing said impregnated paper web between the opposed surfaces of two laminae to be joined, and
   thereafter subjecting said laminae and said interposed web to heat and pressure to consolidate and bond the same.

4. The process of claim 3 wherein
   one of said laminae including at least two individual pieces of material which are held in an abutting side-by-side relationship by said web.

5. The method of making plywood comprising
   moving a first sequence of veneers in abutting relationship in a common, substantially horizontal path,
   continuously depositing on said sequence of veneers a first absorbent paper web coated on both faces with an aqueous alkaline phenol-formaldehyde adhesive composition
   immediately without substantial reduction of moisture from said adhesive composition superposing on said first sequence of veneers and said paper web a second sequence of veneers having the grain thereof angularly disposed with relation to the grain of said first sequence
   continuously depositing on said second sequence of veneers a second absorbent paper web coated on both faces with an aqueous, alkaline phenol-formaldehyde adhesive composition
   said adhesive composition including resin solids having a formaldehyde to phenol molar ratio between about 1.5 to 1 and 3 to 1
   forming sub-assemblies from said first and second sequences of veneers and said webs by parting said web and veneers at the point of abutment between the veneers of said first sequence
   forming a plywood assembly by depositing on each sub-assembly a veneer face having its grain substantially aligned with the grain of said first sequence, and
   subjecting said plywood assembly to heat and pressure to consolidate and bond the same.

6. The method of making plywood sub-assemblies comprising
   moving a first sequence of veneers in abutting relation in a common, substantially horizontal path
   continuously depositing on said sequence of veneers a first absorbent paper web coated on both faces with an aqueous alkaline phenol-formaldehyde adhesive composition
   immediately without substantial reduction of moisture from said adhesive composition superposing on said first sequence of veneers and said paper web a second sequence of veneers having the grain thereof angularly disposed with relation to the grain of said first sequence
   continuously depositing on said second sequence of veneers a second absorbent paper web coated on both faces with an aqueous alkaline phenol-formaldehyde adhesive composition
   said adhesive composition including resin solids having a formaldehyde to phenol molar ratio between about 1.5 to 1 and 3 to 1
   forming sub-assemblies from said first and second sequences of veneers and said webs by parting said web and veneers at the point of abutment between the veneers of said first sequence.

7. The method of making plywood from the subassemblies of claim 6, comprising
   positioning the first veneer of one assembly on the second web of a second assembly
   placing a face veneer on the uppermost web while insuring that the grain of each veneer is angularly disposed to the grain of the adjacent veneer, and
   subjecting the veneers and the webs to heat and pressure to consolidate and bond the same.

References Cited by the Examiner

UNITED STATES PATENTS

| 2,089,034 | 8/1937 | Nevin | 156—313 |
| 2,271,744 | 12/1938 | Nevin | 156—64 |
| 2,323,105 | 6/1943 | Welch | 156—300 X |
| 2,631,098 | 3/1953 | Redfern | 161—262 X |

FOREIGN PATENTS 589,175  6/1947  Great Britain.

EARL M. BERGERT, *Primary Examiner.*

T. R. SAVOIE, *Assistant Examiner.*